United States Patent Office 3,379,592
Patented Apr. 23, 1968

3,379,592
DECORATION OF THERMOSET PLASTICS
Joel Ostrowicz, Alagoas 475, Sao Paulo, Brazil
No Drawing. Filed Sept. 12, 1962, Ser. No. 223,276
10 Claims. (Cl. 156—232)

This invention relates to an improved process for decorating thermoset plastic articles. It relates more particularly to the decoration of such articles in the form of dinnerware and to the decoration of dinnerware produced from melamine-formaldehyde and urea-melamine-formaldehyde resins. It also relates to the use, as the decorating medium, of thermosetting resin inks in which the resin is partially pre-cured prior to the application of the decoration to the surface of the plastic articles.

The only commercial method for the decoration of, e.g., melamine dinnerware known heretofore involves the use of an impregnated paper system. In this system, a pure cellulosic paper is printed in rolls and is then impregnated with, e.g., a melamine resin. The impregnated rolls are then continuously dried and are then cut up to provide individual, printed and impregnated paper sections which are identical in size to that of the surface to which they are to be applied to provide the desired decoration thereon. These sections are applied to the surface of semi-molded plastic articles during the molding cycle, the curing being thereafter completed in the mold under the influence of heat and pressure. Prior to the final completion of the molding cycle, a second thin impregnated, undecorated paper layer may be placed over the design-bearing layer for protection of the latter. In this process, the impregnated paper sheet remains permanently imbedded at or near the surface of the molded article and, consequently, the paper itself contributes, often undesirably, to the final appearance of the decorated article.

Because of the presence of the paper layer in the molded articles, it has not been possible heretofore on a commercial basis to produce translucent or white molded articles. It is evident that articles containing a solid paper layer cannot be translucent, and the production of white molded articles was not feasible because the paper layer imparts a grayish cast to the article after molding. Another problem in the use of the impregnated paper layer is that, in order to avoid non-uniformity in the appearance of the articles, the impregnated paper sheet must cover the entire surface of the article even though the design takes up only a small area thereof. Further, if the impregnated paper sheet is shifted in its position during the molding process, the article must be discarded because the paper sticks over the edges in places and does not cover the surface in other places. The retention of the paper layer in the molded articles, even where whiteness and translucency are not desired, affects adversely the original color of the molded articles. The expense of the impregnated paper is another undesirable factor in that such paper, because of the pure cellulosic stock required and the several processing steps involved, has undesirably high costs.

Processes have been patented, but not commercialized, in which the impregnated paper layer has been omitted in the decoration of thermoplastic and thermoset plastic articles. However, even in the case of the thermoset plastic articles, these processes call for the use of thermoplastic resin coatings and/or inks and, consequently, are of no utility for the decoration of articles, such as dinnerware, which have to be heat-resistant and able to withstand dish washing in hot or boiling water. Also, even though the molded article is prepared from a thermosetting resin, the use of a thermoplastic resin in connection with the decoration of such an article means that full compatibility between the resin of the molded article and the resin of the decoration is not achieved and an adherent chemical bond between the two such resins is not obtained during the curing of the thermosetting resin. As a result, such decorated articles are deficient in that a separation of the two resins occurs when such molded articles are subjected to the action of boiling water. Another problem with the use of thermoplastic resins for the decoration of plastic articles made from thermosetting resins is that the thermoplastic resin is most likely, when subjected to molding temperatures of 140°–160° C., to show bleeding and distortion to a visible degree, thus causing a great number of rejects.

It is an object of this invention to provide a process for the decoration of thermoset plastic articles which enables the production of translucent articles and, when desired, perfectly white (except for the decoration) articles.

It is another object of this invention to utilize thermosetting resins both for the production of the molded articles and for the decoration thereof, particular importance being attached to the partial pre-curing of the thermosetting resin decoration.

Another object is to obtain optimum results through the use of an urea-melamine-formaldehyde resin for both the molded article and the decoration thereof.

Other objects will be evident from the detailed description of the invention which follows.

In general, the process of this invention for producing decorated thermoset plastic articles comprises the steps of: (1) forming and partially curing a thermosetting molding compound under conditions of heat and pressure in a mold; (2) applying a thermosetting resin ink in a desired design to the surface of a non-impregnable film, which film is capable of withstanding being subjected to molding temperatures of from about 120° to about 160° C., and thereafter curing said applied ink to an intermediate stage of polymerization; (3) placing the ink-bearing film surface in contact with a surface of the partially cured plastic article; (4) completing the curing of said article and said applied resin ink in said mold whereby said applied resin is homogeneously and integrally bonded to said plastic article; and (5) after opening the mold, stripping said film from the thermoset plastic article. Another feature of this invention is that, subsequent to step (5), a thin layer of liquid melamine resin is desirably sprayed on the decorated surface and the mold is closed again for an additional curing cycle of up to about 30 seconds under pressure and heat, this additional thin layer providing an effective abrasion protection for the design during the subsequent polishing step and in the daily use of the resulting plastic article. This invention is useful for the decoration of any surface of a thermoset plastic article which is capable of receiving a design, but it has particular utility in the decoration of thermoset plastic articles in the form of dinnerware.

The foregoing steps may be summarized in the following manner:

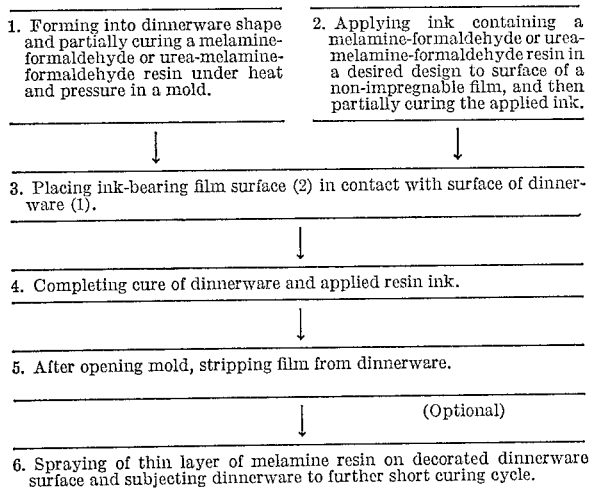

Any of the thermosetting resins may be used in preparing the molding compounds used in the process of this invention. These include phenol-formaldehyde; phenol-furfural; urea-formaldehyde; and melamine-formaldehyde resins. While it is to be understood that this invention is not limited with respect to the type of plastic article which can be decorated thereby, for ease of understanding the following description of the invention will be directed primarily to the decoration of dinnerware. For this end use, melamine-formaldehyde and mixed urea-melamine-formaldehyde resins have particular utility. Normal molding equipment and the usual molding cycles can suitably be used in the process of this invention.

The use of the mixed urea-melamine-formaldehyde resins in molding compounds is made possible through an invention claimed in my co-pending application, Ser. No. 213,904 filed Aug. 1, 1962, now Patent No. 3,320,192. Said invention relates to the use of zinc sulfite as the accelerator for producing simultaneous polymerization of the melamine and urea portions of the mixed aminoplast resin molding compound during the molding step. In the case of such mixed resins, the weight ratio of urea to melamine in the urea-melamine-formaldehyde resin can suitably range from about 1:10 to about 2:1. A preferred range for this weight ratio is from about 1:1.5 to about 1.5:1. The resulting molding compounds combine the optimum properties of melamine and urea resins, namely, the excellent heat resistance, impact strength, hardness and low water absorption of the melamine resins, and the better tensile strength, flexural strength, dielectric strength, plasticity and lower shrinkage of the urea resins.

As indicated above, the desired design is applied to the surface of a now-impregnable film, which film is resistant to deterioration at molding temperatures of up to about 160° C. The non-impregnable (i.e., substantially impervious) feature is important since, if some of the thermosetting resin ink became imbedded in the interstices of the film, it would be difficult, if not impossible, to smoothly strip the film from the surface of a decorated plastic article on the completion of the curing and molding cycle. The film preferred for the purpose of this invention is an uncoated cellophane film. The uncoated film is preferred because of the difficulty of producing and retaining a smooth coated surface thereon. Exemplary of other film materials suitable for carrying the thermosetting resin ink decoration are thin metal foils, such as aluminum foil. Films prepared from polyolefins, such as polyethylene, can also be desirably used in the process of this invention. The thickness of the cellophane or other films is not critical since they are stripped from the finished molded articles. They should not be so thin as to create difficulty in handling them, but should be sufficiently thin so that they can adapt themselves to the contour of the article being molded and so that they are sufficiently flexible as to be readily stripped from the finished molded article.

In order to provide a homogeneous and integral bond between the decoration and the body of the molded article, it is desirable that the resins of the ink and the article have the same or approximately the same composition. However, the main requirement for both resins is that they be thermosetting. In the preparation of the resin ink, the thermosetting liquid resin is desirably diluted with a small portion of a lower boiling alcohol, such as ethyl alcohol, or other low boiling solvent to permit quick drying of the ink after the application thereof to the film carrier surface. The resulting resin-alcohol or other solution is thoroughly mixed with dyes or pigments suitable for obtaining the desired coloring effect in the finished decorated article. Any printing technique capable of producing a single- or multi-color pattern on the carrier film is suitable, although the use of the silk-screen method of printing has proved to be quite advantageous. Since an ink containing a liquid thermosetting resin in solution is apt to bleed and distort during the molding cycle, it is a feature of this invention that the film carrier, to which the ink design has been applied, is passed through a drier at a temperature of from about 110° to about 140° C. for from about 3 to about 8 minutes. This heat treatment has the effect of partially pre-curing the resin contained in the ink, and it has been found that the use of such pre-cured ink in the process of this invention results in the production of molded articles on which the decoration is sharp and clear with no indication of fuzziness, bleeding or distortion of the applied decoration.

As indicated above, the thermosetting molding compound is partially cured in a mold of the desired shape to preform the article being molded, such partial cure being desirably effected in about one-half of the duration of the regular curing cycle. The film carrier, bearing the printed and pre-cured thermosetting resin ink design, is then placed in the mold with the print facing the surface to receive the decoration. The curing cycle is completed, enabling the simultaneous curing of the design and the molded article with a homogeneous, integral bond being formed between them. The mold is then opened and the film is stripped from the molded article. At this point, in order to produce a better finish and protection for the decorated surface, a thin layer of liquid melamine-formaldehyde resin, suitably corresponding in composition to that of the resin used in the ink and the molded article, is sprayed on the decorated surface, and the mold is closed again for an additional cure of up to 30 seconds under pressure and heat. This additional clear resin layer provides an effective abrasion protection for the design during the subsequent polishing step and during the daily use of the plastic articles, such as dinnerware. Unlike previous processes in which decorated, impregnated paper remains as part of the finished, molded article, the film used in the process of this invention can be the same size as the surface being decorated, or it can be only slightly larger in area than that of the applied design so as to enable the more convenient handling of the film during the subsequent steps of the process. In other words, the design determines the necessary size of the film carrier, and the waste inherent in using impregnated paper sheets large enough to cover the entire surface of the molded article regardless of the minuteness of the design thereof, is eliminated. Also, with the pre-curing of the resin ink in accordance with the process of this invention, no harm is done to the design if the position of the decoration-bearing carrier is shifted after its application to the molded article and prior to completion of the molding.

The following is a specific example of the process of this invention:

Example

An ink was prepared by mixing thoroughly 300 grams of a pigment in powder form (420 mesh) with a solution of 200 grams of phenol-formaldehyde liquid resin (pH greater than 7) and 25 grams of mineral spirits (170°–250° F.). The resulting ink was in the form of a stiff paste, and was used to print, by way of the silk-screen method, the desired design on an uncoated cellophane film having the thickness of 0.04 mm. The printed cellophane film was kept for 5 minutes at 130° C. in an oven, at which time the resin ink solvent had evaporated and the resin had become partially cured.

A melamine-urea-formaldehyde molding compound (prepared as described above) was placed in a mold to form a 300 gram dinner plate (10 inches in diameter). The mold was previously fixed in a hydraulic press. The press was closed and 75 tons of pressure was applied, while the temperature of the mold was maintained at 150° C. After 90 seconds of curing, the mold was opened and the flash was blown away by compressed air. The printed and dried cellophane film was placed on the upper surface of the plate being formed in the mold with the design-bearing face toward the molded surface. The press was closed again at the same pressure and temperature for additional cure. After 60 seconds, the press was opened and the cellophane film was stripped off with the aid of a compressed air blow. While the molded plate was still in the mold, a thin layer of pure melamine-formaldehyde resin was sprayed on the decorated surface and the mold was closed again for another 30 seconds, again at the same pressure and temperature.

In such a way, the curing cycle was completed, totalling 3 minutes. The mold was opened and the molded piece was removed. When submitted to high polishing for a brilliant surface, the design remained unaffected, without showing different layers or an uneven surface. This plate remained unaffected by multiple exposures to boiling water and had an attractive translucent appearance.

The process of this invention overcomes the defects of prior art processes and enables the production of thermoset plastic articles bearing clearly defined decorations. The elimination of the prior art impregnated paper permits the production of molded articles which are translucent, which, if desired, can be white rather than grayish in cast, and which do not have the desired color thereof altered by the presence of a paper layer. Furthermore, the use of a partially precured, thermosetting resin ink decoration overcomes the bleeding and distortion difficulties encountered with the use of prior art thermoplastic resin decorations and/or protective coatings. The savings and other advantages realized through the use of the process of this invention have been referred to above.

Since certain changes in carrying out the above described process may be made without departing from the spirit of this invention, it is intended that all matter contained in the above description shall be interpreted as illustrative and not in a limiting sense. Modifications may be resorted to within the scope of the invention as described and claimed.

Having thus described my invention, what I claim and desire to protect by Letters Patent is:

1. The process of producing decorated thermoset plastic dinnerware which comprises the steps of:
   (1) forming into a desired dinnerware shape and partially curing a thermosetting molding compound selected from the group consisting of melamine-formaldehyde and urea - melamine - formaldehyde resins under conditions of heat and pressure in a mold;
   (2) applying a thermosetting resin ink containing a resin selected from the group consisting of melamine-formaldehyde and urea - melamine - formaldehyde resins in a desired design to the surface of a non-impregnable film, which film is capable of withstanding being subjected to molding temperatures of from about 120° to about 160° C., and thereafter curing said applied ink to an intermediate stage of polymerization;
   (3) placing the ink-bearing film surface in contact with a surface of the partially cured plastic dinnerware;
   (4) completing the curing of said dinnerware and said applied resin ink in said mold whereby said applied resin is homogeneously and integrally bonded to said plastic dinnerware; and
   (5) after opening the mold, stripping said film from the thermoset plastic dinnerware.

2. The process of claim 1 in which said thermosetting molding compound is prepared from a melamine-formaldehyde resin.

3. The process of claim 1 in which said thermosetting molding compound is prepared from a urea-melamine-formaldehyde resin in which the weight ratio of urea to melamine ranges from about 1:10 to about 2:1.

4. The process of claim 1 in which said non-impregnable film is an uncoated cellophane film.

5. The process of claim 1 in which said ink comprises a melamine-formaldehyde resin.

6. The process of claim 1 in which said ink comprises a urea-melamine-formaldehyde resin in which the weight ratio of urea to melamine ranges from about 1:10 to about 2:1.

7. The process of claim 1 in which the step of curing said ink to an intermediate stage of polymerization is effected by passing the film bearing the applied design through a drier at a temperature of from about 110° to about 140° C. for from about 3 to about 8 minutes.

8. The process of claim 1 in which the partial curing of said molding compound in step (1) is effected in about one-half of the time cycle required for the complete curing thereof.

9. The process of claim 1 in which said film is at least as large in area as that of the applied design.

10. The process of claim 1 in which, subsequent to step (5), a thin layer of liquid melamine resin is sprayed on the decorated surface and the mold is closed again for an additional curing cycle of up to about 30 seconds under pressure and heat, this additional thin layer providing an effective abrasion protection for the design during the subsequent polishing step and in the daily use of said plastic article.

References Cited

UNITED STATES PATENTS

| | | | |
|---|---|---|---|
| 1,742,516 | 1/1930 | Mills | 264—246 |
| 2,646,380 | 7/1953 | Barlow et al. | 156—297 X |
| 2,523,234 | 9/1950 | Rado | 156—232 |
| 2,874,419 | 2/1959 | May et al. | 156—224 |
| 3,057,018 | 10/1962 | Lawrence et al. | 156—242 |
| 3,180,776 | 4/1965 | Hessel | 156—277 |
| 2,817,619 | 12/1957 | Bickel et al. | 264—245 |

FOREIGN PATENTS 816,927   7/1959   Great Britain.

EARL M. BERGERT, *Primary Examiner.*

T. R. SAVOIE, *Assistant Examiner.*